United States Patent
Wilkes et al.

(10) Patent No.: US 8,423,161 B2
(45) Date of Patent: Apr. 16, 2013

(54) METHODS AND SYSTEMS FOR GAS TURBINE MODELING USING ADAPTIVE KALMAN FILTER

(75) Inventors: Kevin Wood Wilkes, Greenville, SC (US); Randy Scott Rosson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 13/216,571

(22) Filed: Aug. 24, 2011

(65) Prior Publication Data

US 2013/0054031 A1 Feb. 28, 2013

(51) Int. Cl.
 G05B 13/02 (2006.01)
 G05B 21/00 (2006.01)
 G01N 21/00 (2006.01)
 G01N 31/00 (2006.01)
 G01N 33/00 (2006.01)

(52) U.S. Cl.
 USPC ............ 700/31; 700/28; 700/266; 700/274; 42/62

(58) Field of Classification Search .................. None
See application file for complete search history.

(56) References Cited

U.S. PATENT DOCUMENTS

| 7,742,904 B2 | 6/2010 | Healy et al. |
| 2003/0078680 A1 | 4/2003 | Edwards et al. |
| 2005/0234688 A1 | 10/2005 | Pinto et al. |
| 2006/0184255 A1 | 8/2006 | Dixon et al. |
| 2007/0073525 A1 | 3/2007 | Healy et al. |
| 2011/0153295 A1 | 6/2011 | Yerramalla et al. |

OTHER PUBLICATIONS

Search Report and Written Opinion from EP Application No. 12180586.5 dated Nov. 22, 2012.

*Primary Examiner* — Jill Warden
*Assistant Examiner* — Charles D Hammond
(74) *Attorney, Agent, or Firm* — Armstrong Teasdale LLP (57) ABSTRACT

A system and method for modeling a gas turbine assembly include a plurality of sensors configured to measure a plurality of operating parameters of a turbine assembly. The system further includes a model configured to compare the plurality of operating parameters with a plurality of predicted parameters to determine difference values. A Kalman filter of system is configured to evaluate the difference values to facilitate adjusting the model. The Kalman filter is further configured to accommodate for a missing operating parameter of the plurality of operating parameters to facilitate tuning the model.

19 Claims, 4 Drawing Sheets

METHODS AND SYSTEMS FOR GAS TURBINE MODELING USING ADAPTIVE KALMAN FILTER

BACKGROUND OF THE INVENTION

The present invention relates to a control system for use with a gas turbine and more particularly to methods and systems that adjust a model of the gas turbine in the control system when an operating parameter is unavailable or corrupt.

At least some known gas turbines include controllers that monitor and control their operation. The controllers govern the combustion system of the gas turbine and other operational aspects of the gas turbine, and typically execute scheduling algorithms that adjust control inputs to facilitate safe and efficient operation of the gas turbine.

Gas turbine controllers typically receive input values of measured operating parameters and desired operating settings that, in conjunction with scheduling algorithms, determine settings for control parameters to achieve the desired operation. Measured operating parameters may include compressor inlet pressure and temperature, compressor exit pressure and temperature, turbine exhaust temperature and generator power output. Desired operating settings may include generator power output and exhaust energy. Typical control parameters include fuel flow, combustor fuel splits, guide vane position, and inlet bleed heat flow. Scheduling algorithms can cause the gas turbine to operate at a desired state, such as at a desired power output level and/or within defined emission limits.

At least some known controllers include a Kalman filter to reconcile measured gas turbine performance data with predicted performance from a gas turbine cycle model. Known filter configurations for use with gas turbines require measured data parameters for at least the compressor exit pressure and temperature, turbine exhaust temperature, and net shaft output power. Data reconciliation can be difficult when one of the measured parameters is unavailable or corrupt. Net shaft power, for example, may be unavailable or difficult to measure in gas turbines in which the turbine shaft drives multiple components, i.e., where a steam turbine and a gas turbine are coupled to the same shaft. This configuration may make it difficult to quantify the power contribution of the gas turbine and the steam turbine. When a measure of gas turbine shaft power is unavailable as input to the filter, the filter may be under-constrained or the filter may reconcile the measured gas turbine performance data less effectively.

BRIEF DESCRIPTION OF THE INVENTION

In one aspect, a method for modeling a gas turbine is provided. The method includes generating a plurality of predicted operating parameters using a model of the gas turbine assembly and sensing a plurality of operating parameters during operation of the gas turbine assembly. The method also includes determining difference values between the plurality of measured operating parameters and the plurality of predicted operating parameters. A determination is made of at least one of a missing sensed operating parameter and a corrupt sensed operating parameter of the plurality of sensed operating parameters and generating a synthesized output parameter based on the at least one of a missing sensed operating parameter and a corrupt sensed operating parameter. Additionally, the method includes configuring a Kalman filter based on the synthesized output parameter to generate an adjustment parameter. The adjustment parameter is applied to the model to facilitate adjustment of the model of the turbine assembly during operation of the gas turbine assembly.

In another aspect, a method for modeling a gas turbine is provided. The method includes generating a plurality of predicted operating parameters using a model of the gas turbine assembly. Further, the method includes sensing a plurality of operating parameters during operation of the gas turbine assembly, the plurality of predicted operating parameters includes at least one of a compressor exit pressure, a compressor exit temperature and a turbine exhaust temperature of the turbine assembly during operation of the gas turbine assembly. The method also includes determining difference values between the plurality of measured operating parameters and the plurality of predicted operating parameters. A determination is made of at least one of a missing sensed operating parameter and a corrupt sensed operating parameter of the plurality of sensed operating parameters and generating a synthesized output parameter based on the at least one of a missing sensed operating parameter and a corrupt sensed operating parameter. Additionally, the method includes configuring a Kalman filter based on the synthesized output parameter to generate an adjustment parameter. The adjustment parameter is applied to the model to facilitate adjustment of the model of the turbine assembly during operation of the gas turbine assembly.

Further, in another aspect, a control and modeling system for use in operation of a gas turbine assembly is provided. The system includes a plurality of sensors configured to measure a plurality of operating parameters of the gas turbine assembly. The system further includes a controller coupled to the plurality of sensors for receiving a plurality of signals indicative of the measured operating parameters, the controller includes an operational model configured to tune the gas turbine assembly. The model includes a plurality of predicted parameters stored therein for use in and determining at least one difference value between the plurality of predicted parameters and the plurality of operating parameters by comparing the plurality of predicted parameters with the plurality of measured operating parameters. The model is configured to determine at least one of a missing sensed operating parameter and a corrupt sensed operating parameter of the plurality of sensed operating parameters and generate a synthesized output parameter. The system also includes a Kalman filter coupled to the controller. The Kalman filter is configured to accommodate the synthesized output parameter for the at least one of a missing operating parameter and a corrupt operating parameter of the plurality of operating parameters by generating an adjustment parameter. The Kalman filter is also configured to apply the adjustment parameter to the model to facilitate tuning the operational model.

DETAILED DESCRIPTION OF THE INVENTION

The embodiments described herein include exemplary control systems and methods that use an adaptive gas turbine model to predict certain operating parameters of a gas turbine. The model includes a method that enables missing data to be replaced with a performance constraint between at least two components of the gas turbine. In the exemplary embodiment, the system also accommodates a lack of data relating to measured shaft output power to enable the model to be tuned. The system, however, can accommodate a lack of data relating to any operating parameter of gas turbine.

Figure 1:
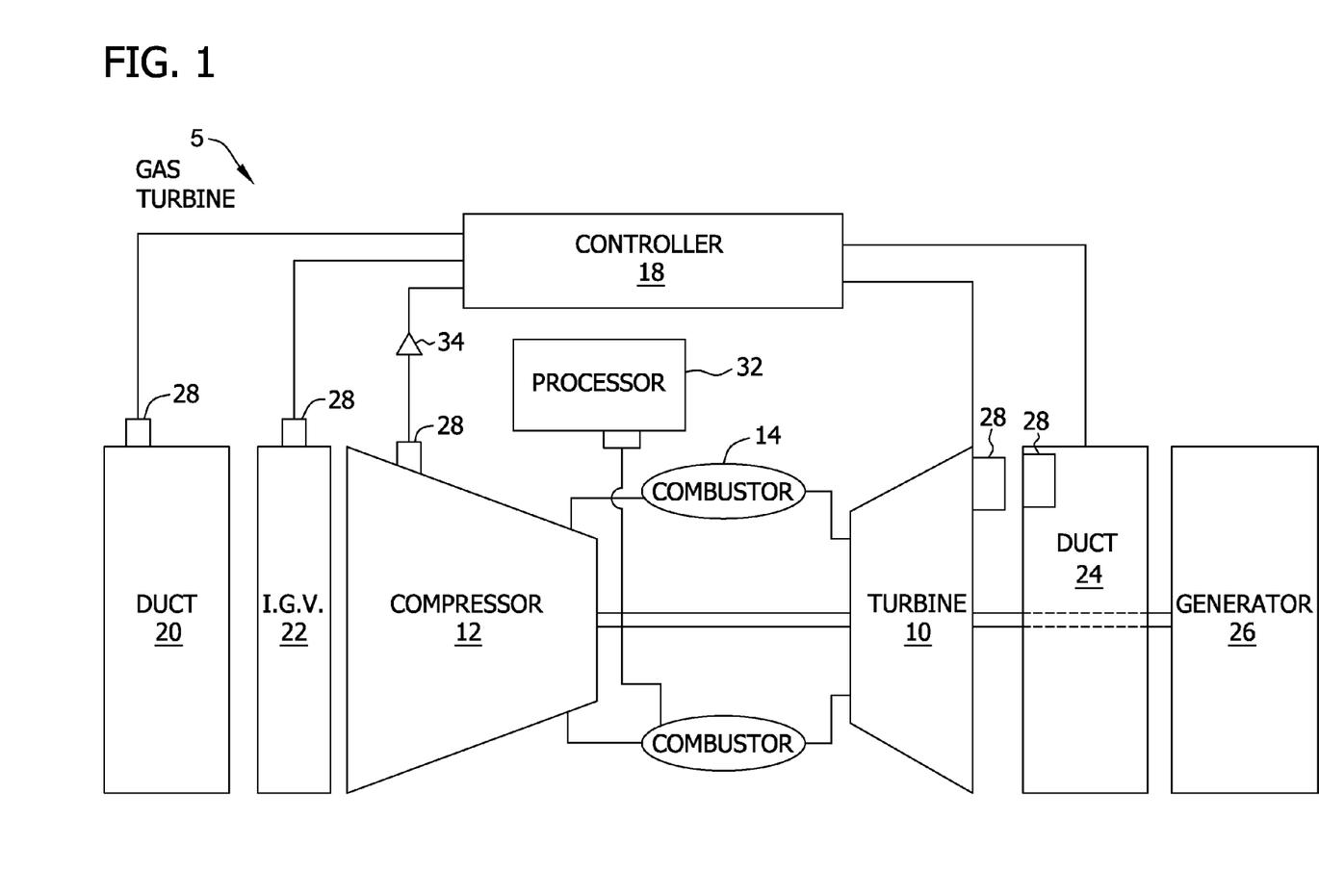
FIG. 1 is a schematic depiction of an exemplary gas turbine including an exemplary control system.

FIG. 1 illustrates a schematic illustration of a gas turbine system 5. In the exemplary embodiment, gas turbine 5 includes a turbine 10, a compressor 12, combustor 14, and a computer controller 18. An inlet duct 20 to compressor 12 feeds ambient air to compressor 12. Inlet duct 20 may include multiple ducts, filters, screens and/or sound absorbing devices that contribute to a pressure loss of ambient air flowing through inlet 20 and into inlet guide vanes 22 of compressor 12. An exhaust duct 24 directs combustion gases through emission control and sound absorbing devices that induce a backpressure to turbine 10. The amount of inlet pressure loss and back pressure may vary over time as components are added/removed to ducts 20 and IGV 22, or due to dust and dirt clogging inlet duct 20, and/or to exhaust duct 24. The inlet loss to compressor 12 and turbine exhaust pressure loss tend to be a function of corrected flow through compressor 12 as turbine 10 drives a generator 26 that produces electrical power.

In the exemplary embodiment, the operation of gas turbine 5 is monitored by several sensors 28 that detect various observable conditions of turbine 10, generator 26 and ambient environment. Sensors 28 can also measure the same operating conditions at different relative locations. For example, groups of redundant temperature sensors 28 can be used to monitor ambient temperature, compressor discharge temperature, turbine exhaust gas temperature, and other temperature measurements of the gas stream through the gas turbine 5. Similarly, groups of other redundant pressure sensors 28 monitor ambient pressure, and static and dynamic pressure levels at compressor inlet and outlet, turbine exhaust, at other locations in the gas stream flowing through the gas turbine 5. Such redundant sensors 28 may include, but are not limited to only including, flow sensors, speed sensors, flame detector sensors, valve position sensors, guide vane angle sensors, or any other device that may be used to sense various parameters pertinent to the operation of gas turbine 5.

As used herein, the term "parameter" refers to operational aspects that can be used to define the operating conditions of gas turbine 5, such as, but not limited to, temperatures, pressures, and gas flows at defined locations in gas turbine 5. Some parameters are measured, i.e., are sensed and are directly known. Other parameters are predicted by a model and are indirectly known. Such parameters are initially input by a user to controller 18. The measured, predicted, and/or input parameters facilitate representing a given operating state of gas turbine 5.

In the exemplary embodiment, controller 18 includes a processor 32 that selectively executes algorithms to control the operation of gas turbine 5 based at least partially on sensor signals 34 generated by sensors 28 and on instructions provided by users. The programs executed by controller 18 may include scheduling algorithms that control operation of gas turbine 5, such as by regulating a fuel flow to combustor 14. Commands generated by controller 18 may cause actuators on gas turbine 5 to, for example, adjust a relative position of valves coupled between the fuel supply and combustors to selectively regulate the fuel flow, fuel splits, and/or type of fuel channeled to the combustors: other commands may be generated to adjust a relative position of inlet guide vanes 22, and/or to activate other control settings on gas turbine 5.

The scheduling algorithms enable controller 18 to maintain inputs for parameter variables such as a current compressor pressure ratio, an ambient specific humidity, an inlet pressure loss, and/or a turbine exhaust back pressure. Controller 18 executes the algorithms to ensure gas turbine 5 is operated with a schedule that satisfies performance objectives, while complying with operability limitations of gas turbine 5.

Figure 2:
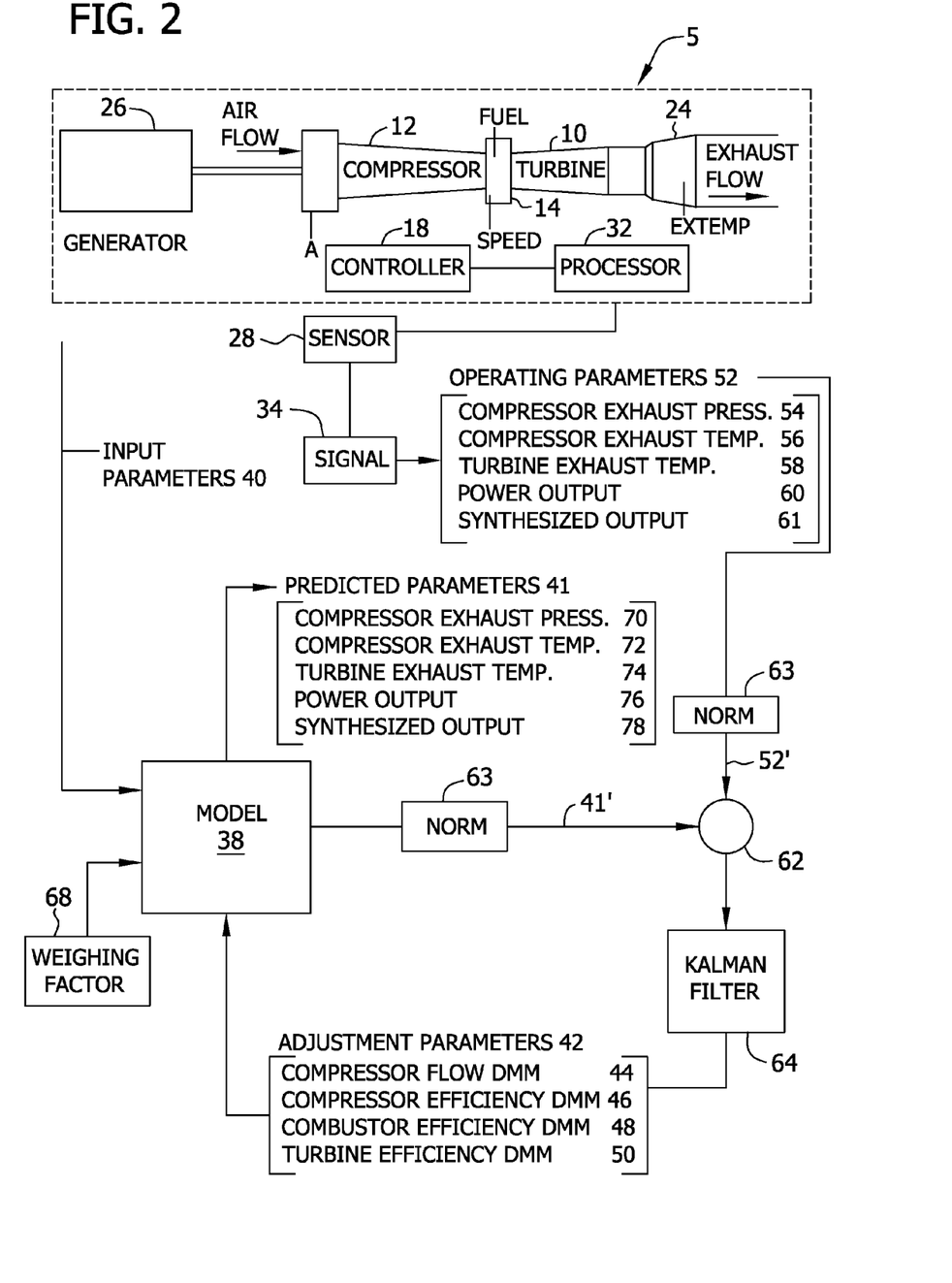
FIG. 2 is a block diagram of the gas turbine shown in FIG. 1 and a model and a Kalman filter used with the control system shown in FIG. 1.

FIG. 2 is a block diagram of gas turbine 5 and a model 38 used with controller 18 to electronically model, in real-time, operation of gas turbine 5. In the exemplary embodiment, model 38 includes platforms such as, but not limited to, a physics-based aero-thermodynamic computer model, a regression-fit model, and/or neural-net model. Alternatively, any suitable computer model configuration that enables modeling, operation and adjustment of gas turbine 5 herein may be used.

In the exemplary embodiment, gas turbine 5 has several observable parameters, referred to as input parameters 40 that are primary inputs to model 38. The input parameters 40 include parameters such as, but not limited to, measured signals such as rotor speed, inlet guide vane angle, inlet bleed heat flow, fuel flow, ambient pressure, temperature, and humidity. Gas turbine 5 further includes predicted operating parameters 41 that facilitate tuning model 38. The predicted operating parameters include parameters such as, but not limited to, compressor exhaust pressure, compressor exhaust temperature, turbine exhaust temperature, and net power output. Gas turbine 5 also includes sensed operating parameters 52 which include actual measurements by sensors 28 of the predicted operating parameters 41. Additionally, gas turbine 5 includes adjustment parameters 42 which include calculated outputs from a Kalman filter 64 for use in facilitating tuning model 38. Kalman filter 64 is configured to compare the predicted operating parameters 41 to the sensed operating parameters 52 and to calculate adjustment parameters 42 to be used in conjunction with input parameters 40 to facilitate tuning model 38.

In the exemplary embodiment, adjustment parameters 42 of model 38 may include parameters such as, but not limited to, a compressor flow data match multiplier ("DMM") 44, a compressor efficiency DMM 46, a combustor efficiency DMM 48 (or heat consumption) and a turbine efficiency DMM 50. The number and particular parameters corresponding to the plurality of adjustment parameters 42 may vary between different gas turbine models. Further, any suitable adjustment parameter that enables model tuning herein may be used. Moreover, such adjustment parameters 42 determine modeled operation of gas turbine 5 based on correlating input parameters 40 using known modeling techniques. The plurality of adjustment parameters 42 enables tuning model 38 so that model predicted parameters 41 match operating parameters 52 enabling maintenance and control of gas turbine 5.

Further, in the exemplary embodiment, operating parameters 52 indicate operation of gas turbine 5. In particular, sensors 28 measure operating parameters 52, and parameters 52 monitored are pre-determined based on the specific control system for gas turbine 5 and the type of available sensors 28. In the exemplary embodiment, operating parameters 52 include parameters such as, but not limited to, a compressor exit pressure 54, a compressor exit temperature 56, a turbine exhaust temperature 58, and net shaft power 60. Such operating parameters 52 are based on output signals 34 of sensors 28 monitoring components of gas turbine 5. Multiple redundant sensors 28 may observe each operating parameter 52.

Operating parameter 52 includes any parameter that provides an indication of the actual operation of gas turbine 5.

Model 38 correlates the plurality of sensed operating parameters 52 with the plurality of adjustment parameters 42 based on the execution of pre-determined algorithms. For example, in the exemplary embodiment, compressor exit pressure 54 is correlated to compressor flow 44, compressor exit temperature 56 is correlated to compressor efficiency 46, and turbine exhaust temperature 58 is correlated to turbine efficiency 50.

Sensors 28 measure the plurality of operating parameters 52 during operation of gas turbine 5. Model 38 compares the plurality of predicted parameters 41 to the plurality of measured operating parameters 52. Predicted parameters 41 and measured operating parameters 52 are normalized 63 via model 38 to generate normalized modeled or predicted outputs 41' and normalized measured outputs 52'. These normalized outputs 41' and 52' are compared to generate at least one difference signal 62 that is indicative of an error of modeled predicted performance of gas turbine 5 and actual operation of gas turbine 5. In the exemplary embodiment, at least one difference signal 62 corresponds to each predicted parameter 41, and there may be a difference signal corresponding to each sensor 28 used to measure particular operating parameter 52.

Kalman filter 64 receives as inputs difference signals 62, and generates normalized adjustment parameters 42 that facilitate tuning model 38. In the exemplary embodiment, the adaptive ability of Kalman filter 64 enables it to continue to tune model 38 with a reduced set of difference signals 62. To automatically tune model 38, when one or more of the difference signals 62 is not available, Kalman filter 64 is modified to account for a loss of a difference signal 62. Accordingly, gas turbine 5 can continue to operate and be automatically tuned when sensors 28 fail and/or when tuning input data regarding observable operating conditions is not available or is corrupt.

In particular, Kalman filter 64 enables gas turbine sensor data to be reconciled when there is no sensed data for one of the sensed operating parameters 52 such as, but not limited to, shaft output power 60. Kalman filter 64 accommodates the lack of measured shaft output power 60 to enable tuning of model 38. More specifically, in the exemplary embodiment, model 38 generates a synthesized output parameter 78 for predicted parameters 41 in place of the missing operating parameter 52 such as, for example, shaft power output 60. In particular, Kalman filter 64 adjusts at least one adjustment parameter 42 in response to the synthesized operating parameter 78. In the exemplary embodiment, Kalman filter 64 tunes either combustor efficiency 48 or turbine efficiency 50 of adjustment parameter 42 using a continuously weighted variable average between combustor efficiency 48 and turbine efficiency 50. Kalman filter 64 can tune any missing operating parameter 52 to reconcile synthesized output parameter 78 with synthesized operating output parameter 61 for operating parameters 52 to facilitate adjusting model 38.

In the exemplary embodiment, Kalman filter 64 processes four independent adjustment parameters 42 (model tuners) and four dependent difference signals 62 (the sensed data). Based on the adjustment parameters 42 and the difference signals 62, Kalman filter 64 compiles a matrix of equations to generate an exemplary solution relating to adjustment parameters 42 and difference signals 62. In an embodiment, the plurality of adjustment parameters 42 include compressor flow data match multiplier DMM 44, compressor efficiency DMM 46, combustor efficiency DMM 48 (or heat consumption), and turbine efficiency DMM 50. The difference signals 62 include compressor exit pressure 54, compressor exit temperature 56, turbine exhaust temperature 58, and net shaft output power 60. Alternatively, the plurality of adjustment parameters 42 include any modeled aspect of operation for gas turbine 5 and difference signals 62 include any aspect of actual operation of gas turbine 5.

As noted herein, compressor exit pressure 54 correlates with compressor flow 44 and compressor exit temperature 56 correlates with compressor efficiency 46. Turbine exhaust temperature 58 and shaft power output 60 are determined based on the combination of heat consumption and turbine efficiency. In the absence of measured shaft power output 60, one of the associated component DMMs is fixed, while the other varies, which could result in an infinite possibility of solutions. To compensate, Kalman filter 64 varies combustor efficiency DMM 48 and turbine efficiency DMM 50 with a weighing factor 68 (shown as φ in FIG. 3 and in Equation 1). Determination of the weighing factor 68 can be based on many factors, but in all embodiments, weighing factor 68 is selected to provide adequate constraint for a closed solution to Kalman filter 64.

Kalman filter 64 replaces shaft output 60 with a dependency between the combustor efficiency DMM 48 and turbine efficiency DMM 50. A linear weighing between the two adjustment parameters 42 is exemplified in Equation (1).

$$\left[\frac{x_1}{R_1}\phi + \frac{x_2}{R_2}(1-\phi)\right] \cdot G = G \quad (1)$$

Wherein:
$\chi_1$=Turbine Efficiency DMM 50;
$R_1$=Reference Turbine Efficiency DMM;
$\chi_2$=Combustor Efficiency DMM 48;
$R_2$=Reference Combustor Efficiency DMM;
φ=Weighing Factor 68; and
G=Gain.

Figure 3:
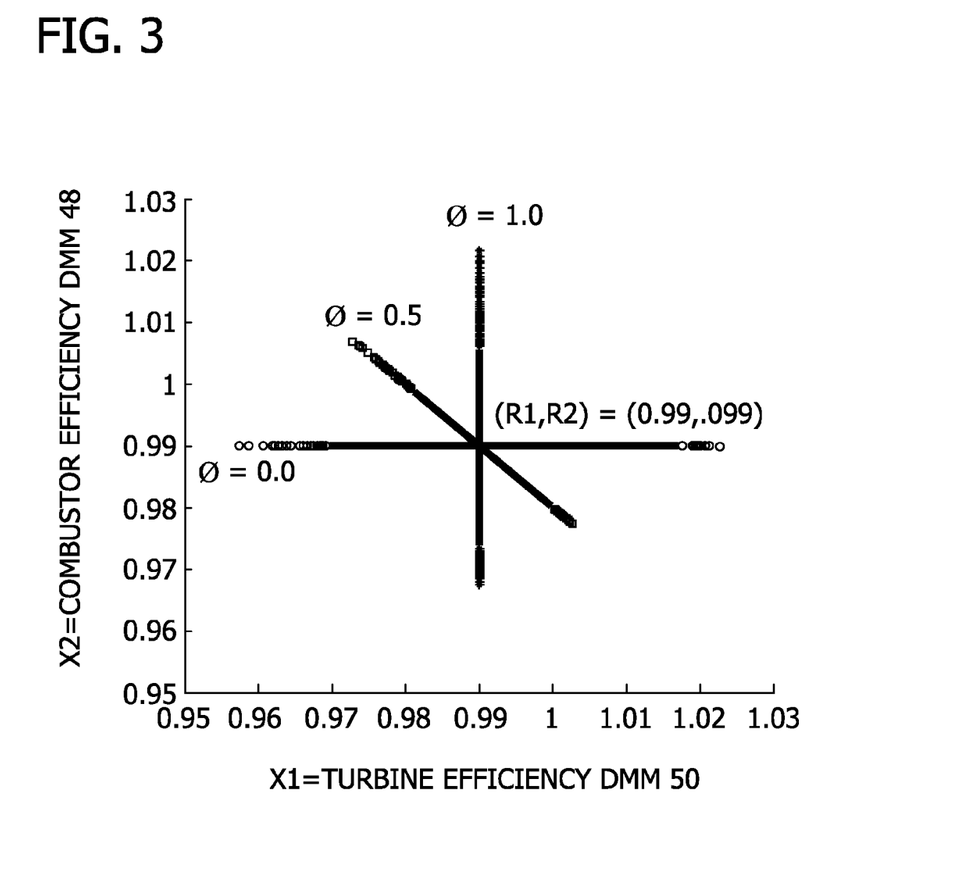
FIG. 3 is a graphical representation of a weighing factor applied to the Kalman filter shown in FIG. 2.

Equation (1) includes reference values R1, R2 for combustor efficiency DMM 48 and turbine efficiency DMM 50 with weighing factor 68 denoted as φ in Equation (1). Reference values R1 and R2 are predetermined values that are based at least partly on operating characteristics and desired modeling of a particular gas turbine 5 (shown in FIG. 1). In the exemplary embodiment, weighing factor φ is between 0.0 to 1.0. The weighing factor φ defines a combustor/turbine constraint that is used to transition the filter configuration from all turbine tuning (φ=1.0) to all combustor tuning (φ=0.0). For example, when φ equals 0.5, both turbine and combustor are tuned during operation of gas turbine 5. The choice of weighing factor φ can be scheduled or predetermined, but once φ is determined, Kalman filter 64 replaces the missing operating parameter 52, i.e., shaft power output 60, with a dependency value between combustor efficiency 48 and turbine efficiency 50 to generate synthesized operating output parameter 61. Kalman filter 64 generates and applies synthesized operating output parameter 61 to adjust model 38 to enable gas turbine 5 to be tuned without any knowledge of shaft power output 60. FIG. 3 illustrates an exemplary graphical relationship between combustor efficiency 48 and turbine efficiency 50 for different values of φ.

In an embodiment, the synthesized operating output parameter 78 generated by model 38 can be represented by the left side of Equation (1) in conjunction with weighing factor 68. Model 38 uses synthesized operating output parameter 61 to replace a missing or corrupt actual operating parameter 52. Controller 18 further generates substantially equivalent measured operating parameter 52 represented by the right side of Equation (1) in the form of constant G. Kalman filter 64 calculates adjustment parameter 42 to facilitate minimizing differences between synthesized outputs (left side of Equation (1)) and measured parameters (right side of Equation (1)).

Figure 4:
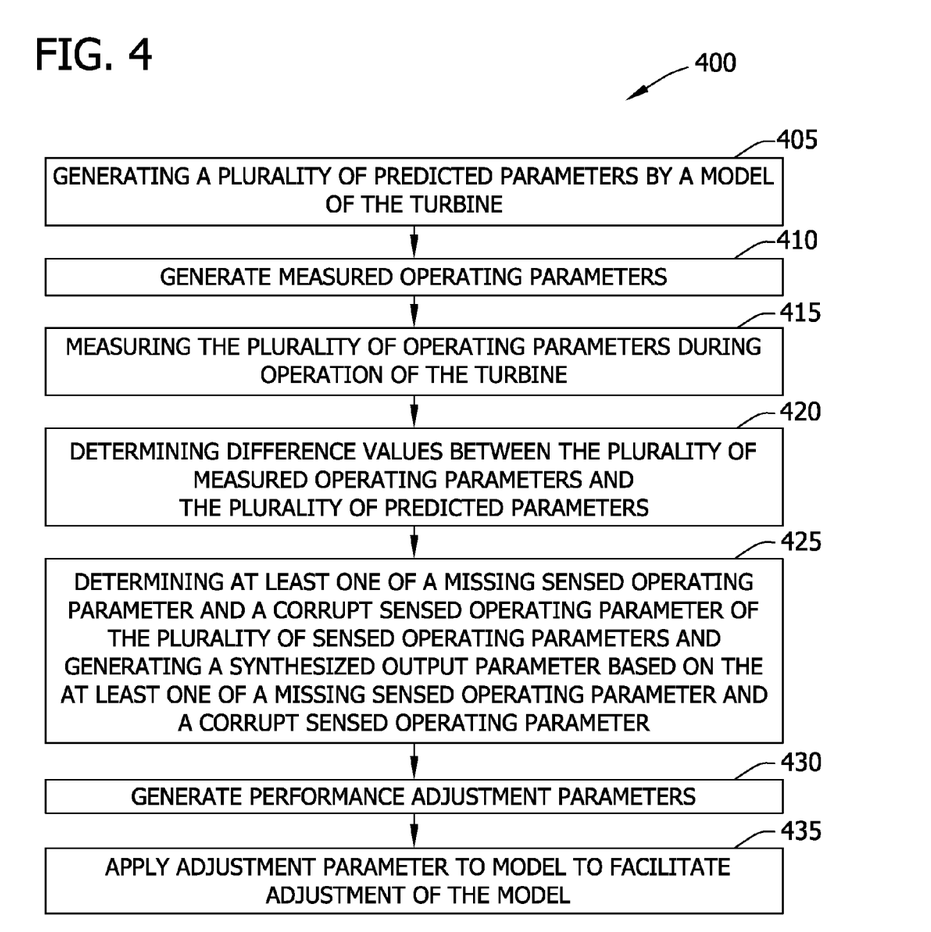
FIG. 4 is a flowchart of an exemplary method of modeling the gas turbine of FIG. 1.

FIG. 4 illustrates an exemplary method 400 of adjusting a model of a gas turbine, for example model 38 of gas turbine 5 (shown in FIG. 2) during an operating cycle. During operation of gas turbine, for example gas turbine 5, model 38 generates 405 predicted operating parameters 41 based on predetermined operating characteristics of gas turbine 5. Model 38 receives 410 adjustment parameters, e.g. compressor flow data match multiplier DMM 44, compressor efficiency DMM 46, combustor efficiency DMM 48, and turbine efficiency DMM 50 (shown in FIG. 2) to facilitate controlling gas turbine 5. The predicted operating parameters 41 and adjustment parameters 42 enable the accuracy of model 38 for evaluation and resultant tuning.

Sensors, such as sensors 28 (shown in FIGS. 1 and 2), measure 415 the plurality of operating parameters 52 during operation of gas turbine 5. In response, sensors 28 generate a plurality of signals 34 that are representative of the plurality of operating parameters 52. Model 38 determines 420 difference values 62 between the plurality of operating parameters 52 and the plurality of predicted parameters 41. Model 38 determines 425 at least one of a missing sensed operating parameter 52 and a corrupt sensed operating parameter 52 of the plurality of sensed operating parameters 52 and generates a synthesized output parameter, such as parameter 78, based on the at least one of a missing sensed operating parameter 52 and a corrupt sensed operating parameter 52.

Model 38 is regularly, automatically, and in real-time tuned using Kalman filter, such as Kalman filter 64 (shown in FIG. 2). Kalman filter 64 uses the synthesized output to generate 430 performance adjustment parameters 42 that are applied to model 38 to facilitate increasing the accuracy of model 38. The adjustment parameters 42 can be calculated using an array of mathematical equations. Kalman filter applies 435 the adjustment parameters 42 to model 38 to facilitate adjustment of model 38 during operation of gas turbine 5. In an embodiment, Kalman filter 64 optimizes the multiplier adjustment parameters 42 to facilitate minimizing the differences between the predicted parameters 41 and measured operating parameters 52.

Model 38 is adaptive to changing efficiencies, flow capacities and other parameters of gas turbine 5. The output performance multipliers generated 430 by Kalman filter 64 enable model 38 to better match the measured operating parameters 52 of gas turbine 5. As such, the Kalman filter 64 adapts to changes in the number of available sensors 28 and type of measured output parameters 52 available. For example, when a measured operating parameter 52, such as shaft power output 60, of gas turbine 5 is unavailable and/or corrupt, Kalman filter 64 accounts for the loss of the measured operating parameter 52 to facilitate adjusting model 38.

The embodiments described herein provide gas turbine control systems that enable automatic adjustments to changes in the gas turbine during long term operation of the turbine by configuring a filter, such as a Kalman filter, to accommodate missing and/or corrupt measured data. The model applies the data reconciliation of Kalman filter to one of the other gas turbine components, or uses a weighted factor as a means to transition from one configuration to another, without interrupting the computational process, as the Kalman filter adjusts the model. Accordingly, the systems and methods described herein replace missing data with a performance constraint that is between at least two of the gas turbine components. Kalman filter applies data reconciliation to one of the other gas turbine components or uses a weighted average of the two components. The constraint is defined to use the weighted factor to transition from one configuration to another configuration without interrupting the computational process such that the Kalman filter is integrated with control software of the turbine.

The system can be integrated within newly manufactured turbines or can be retrofitted/applied to existing turbines. The system adapts to existing turbine operations while inputting changes to Kalman filter and provides a plurality of Kalman filter configurations to be evaluated by changing at least one weighing factor. Moreover, the system works with other components on the same shaft such as fuel gas compressor components.

A technical effect of the system described herein includes using a real-time model, with a Kalman filter, on a single shaft configuration where a measure of an operating parameter, such as shaft power output, is missing, corrupt, and/or is not easily measured. Another technical effect of the system is facilitating automatic adjustment to changes in the gas turbine during long term operation of the turbine.

Exemplary embodiments of systems and methods are described above in detail. The systems and methods are not limited to the specific embodiments described herein, but rather, components of the systems and/or steps of the methods may be utilized independently and separately from other components and/or steps described herein. For example, the systems and methods may also be used in combination with other power systems and methods, and are not limited to practice with only the gas turbine as described herein. Rather, the exemplary embodiments can be implemented and utilized in connection with many other turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for modeling a gas turbine assembly comprising:
   providing a controller comprising an operational model configured to tune the gas turbine assembly;
   generating a plurality of predicted operating parameters using the model of the gas turbine assembly;
   sensing a plurality of operating parameters during operation of the gas turbine assembly using a plurality of sensors;
   determining difference values between the plurality of measured operating parameters and the plurality of predicted operating parameters;

determining at least one of a missing sensed operating parameter and a corrupt sensed operating parameter of the plurality of sensed operating parameters and generating a synthesized output parameter based on the at least one of a missing sensed operating parameter and a corrupt sensed operating parameter;

configuring a Kalman filter, coupled to the controller, based on the synthesized output parameter to generate an adjustment parameter, wherein the adjustment parameter is a weighted ratio between a pair of the measured operating parameters; and applying the adjustment parameter to the model to facilitate adjustment of the model of the turbine assembly during operation of the gas turbine assembly.

2. The method of claim 1, wherein to generate the adjustment parameter, at least one of a compressor flow, a compressor efficiency, a turbine efficiency, and a combustor efficiency are generated.

3. The method of claim 2, wherein the plurality of sensed operating parameters including at least one of a compressor exit pressure, a compressor exit temperature, and a turbine exhaust temperature are measured.

4. The method of claim 2, wherein the Kalman filter is further configured to generate the weighted ratio between at least two of the compressor flow, the compressor efficiency, the turbine efficiency, and the combustor efficiency.

5. The method of claim 4, wherein the Kalman filter is further configured to generate the weighted ratio between combustor efficiency and turbine efficiency.

6. The method of claim 4, wherein the weighted ratio is characterized by the equation:

$$\left[\frac{x_1}{R_1}\phi + \frac{x_2}{R_2}(1-\phi)\right] \cdot G = G$$

wherein:
$\chi_1$=Turbine Efficiency DMM;
$R_1$=Reference Turbine Efficiency DMM;
$\chi_2$=Combustor Efficiency DMM;
$R_2$=Reference Combustor Efficiency DMM;
$\phi$=Weighing Factor; and
G=Gain.

7. The method of claim 6, wherein to determine the weighted ratio the weighing factor comprises a value of 0.0.

8. The method of claim 7, wherein a combustor of the gas turbine assembly is adjusted using the model.

9. The method of claim 6, wherein to determine the weighted ratio the weighing factor comprises a value of 1.0.

10. The method of claim 9, wherein a turbine of the gas turbine assembly is adjusted by the model.

11. The method of claim 6 wherein to determine the weighted ratio the weighing factor comprises a value of 0.5.

12. The method of claim 11, wherein a combustor and a turbine of the gas turbine assembly are concurrently adjusted using the model.

13. A method for modeling a gas turbine assembly, comprising:
providing a controller comprising an operational model configured to tune the gas turbine assembly;
generating a plurality of predicted operating parameters using the model of the gas turbine assembly;
sensing a plurality of operating parameters during operation of the gas turbine assembly using a plurality of sensors, the plurality of predicted operating parameters comprising at least one of a compressor exit pressure, a compressor exit temperature and a turbine exhaust temperature of the turbine assembly during operation of the gas turbine assembly;

determining difference values between the plurality of measured operating parameters and the plurality of predicted operating parameters;

determining at least one of a missing sensed operating parameter and a corrupt sensed operating parameter of the plurality of sensed operating parameters and generating a synthesized output parameter based on the at least one of a missing sensed operating parameter and a corrupt sensed operating parameter;

configuring a Kalman filter, coupled to the controller, based on the synthesized output parameter to generate an adjustment parameter, wherein the adjustment parameter is a weighted ratio between a pair of the measured operating parameters; and applying the at least one adjustment parameter to the model to facilitate adjustment of the model of the gas turbine assembly during operation of the gas turbine assembly.

14. The method of claim 13, wherein the Kalman filter is further configured to generate the weighted ratio between combustor efficiency and turbine efficiency of the gas turbine assembly.

15. The method of claim 14, wherein the weighted ratio is characterized by the equation:

$$\left[\frac{x_1}{R_1}\phi + \frac{x_2}{R_2}(1-\phi)\right] \cdot G = G$$

wherein:
$\chi_1$=Turbine Efficiency DMM;
$R_1$=Reference Turbine Efficiency DMM;
$\chi_2$=Combustor Efficiency DMM;
$R_2$=Reference Combustor Efficiency DMM;
$\phi$=Weighing Factor; and
G=Gain.

16. The method of claim 15, wherein to determine the weighted ratio the weighing factor comprises a value between about 0.0 and 1.0.

17. A control and modeling system for use in operation of a gas turbine assembly, said system comprising:
a plurality of sensors configured to measure a plurality of operating parameters of said gas turbine assembly;
a controller coupled to said plurality of sensors for receiving a plurality of signals indicative of the measured operating parameters, said controller comprising an operational model configured to tune said gas turbine assembly, said model comprising a plurality of predicted parameters stored therein for use in and determining at least one difference value between the plurality of predicted parameters and the plurality of operating parameters by comparing the plurality of predicted parameters with the plurality of measured operating parameters, the model configured to determine at least one of a missing sensed operating parameter and a corrupt sensed operating parameter of the plurality of sensed operating parameters and generate a synthesized output parameter; and
a Kalman filter coupled to said controller, said Kalman filter configured to:
accommodate said synthesized output parameter for the at least one of a missing operating parameter and a corrupt operating parameter of the plurality of operating parameters by generating an adjustment parameter, wherein the adjustment parameter is a weighted ratio between a pair of the measured operating parameters; and apply the adjustment parameter to said model to facilitate tuning the operational model.

18. The system of claim 17, wherein said pair of operating parameters comprise combustor efficiency and turbine efficiency.

19. The system of claim 18, wherein said weighted ratio is characterized by the equation:

$$\left[\frac{x_1}{R_1}\phi + \frac{x_2}{R_2}(1-\phi)\right] \cdot G = G$$

wherein:

$\chi_1$=Turbine Efficiency DMM;
$R_1$=Reference Turbine Efficiency DMM;
$\chi_2$=Combustor Efficiency DMM;
$R_2$=Reference Combustor Efficiency DMM;
$\phi$=Weighing Factor; and
G=Gain, and wherein $\phi$ comprises a value having a range between about 0.0 and 1.0.

* * * * *